Figure 1:
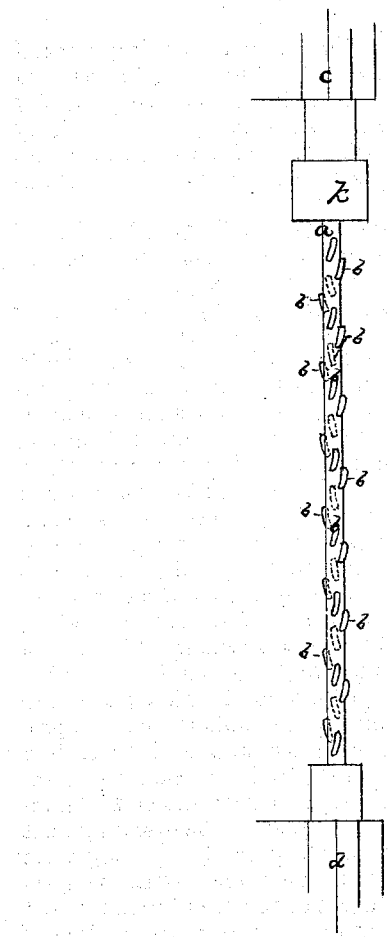
Figure 2:
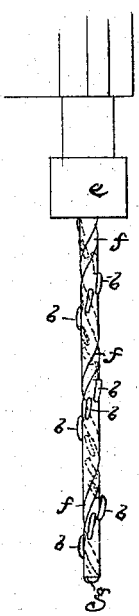

A. S. GEAR.
Mode of Cutting Stone.

No. 125,804.    Patented April 16, 1872.

Witnesses.
M. W. Frothingham.
L. H. Latimer.

Inventor.
Alonzo S. Gear,
By his Attys.
Crosby & Gould 125,804

UNITED STATES PATENT OFFICE.

ALONZO S. GEAR, OF BOSTON, MASSACHUSETTS.

IMPROVEMENT IN MODES OF CUTTING STONE.

Specification forming part of Letters Patent No. 125,804, dated April 16, 1872.

*To all whom it may concern:*

Be it known that I, ALONZO S. GEAR, of Boston, in the county of Suffolk and State of Massachusetts, have invented an Improvement in Cutting Marble and other Stone, &c.; and I do hereby declare that the following, taken in connection with the drawing which accompanies and forms part of this specification, is a description of my invention sufficient to enable those skilled in the art to practice it.

This invention is designed for cutting in curved, angular, sinuous, or tortuous outlines through stone, slate, or marble slabs; or, in other words, is intended to accomplish, to a considerable extent, in stone, &c., what is accomplished in wood by the use of the jig-saw. For cutting stone into layers a diamond-saw has been used, and for plane-surfacing blocks or slabs of stone, &c., a cylinder studded with diamonds has been employed; and, of course, such devices and operations are not included within the scope of my invention, which may be said to consist in a process or mode of operation by which I cut through slabs of stone, &c., in curved or in angular directions by the formation of a somewhat wide kerf, the material on either side of the kerf being undisturbed. In my invention I use a fine or small, round, vertical spindle, the surface of which I stud with black diamonds or carbon points, recesses or slots being made to receive the large ends of the said points, and the walls of the recesses being closed upon the bases of the points, suitable solder being used to firmly confine the points in place. The cutting-points are so arranged in rows that the cutting-points of the different rows merge their paths of action so as to cut the whole length of the cutting plane of the spindle, and the spindle or shaft being thus made, and mounted in a suitable frame between horizontal arms thereof, or as a projection from one arm, rapid rotation is imparted to the shaft, and the block of stone to be slotted or divided is brought opposite the cutting-surface of the spindle, and the stone is then moved laterally against the spindle, (much the same as in jig-sawing,) or the spindle against the stone, the spindle cutting rapidly into the stone in whatever direction may be desired, the line of cut being marked or drawn upon the stone, or a suitable pattern being used. The cutting is thus very rapidly effected by a sort of milling process, and, by the invention, the curved outlines of stone slabs may be very easily, quickly, and beautifully cut.

The drawing represents the spindle which I employ in connection with a work-support in the practice of my invention.

*a* denotes the spindle; *b b*, the diamond or carbon points set into it and arranged around and lengthwise upon it in such manner as to give a continuous cutting-surface from the upper diamond point to the lower one. The spindle may be mounted and rotated in bearings *c d*, or may simply extend from a rotary cutter-head or stock, *e*, (rotated in suitable bearings,) without support at the opposite end. The diamond or carbon points are preferably arranged spirally around the spindle, and they may be placed between spiral or longitudinal grooves *f* in the surface of the spindle, as shown at B, these grooves permitting water to be fed to the spindle and conducted along its length between the rows of diamond points; and the lower end or point of the spindle may be provided with an entering diamond or carbon point, *g*, which will permit the spindle to enter the stone by axial movement of the spindle or upward movement of the stone against the point, thus enabling the tool to begin its work at any part of the stone. With the spindle a guide-collar, *h*, may be used to run against the edge of a pattern to determine the line of action of the tool.

The bases of the diamond points are set in sockets made in the spindle to receive them, they being confined in position in the sockets by suitable solder, and being so set that the strain upon them in their rotative action against the work tends to hold them firmly in their settings.

In some cases I prefer to add to the rotary motion of the spindle a reciprocating motion in the direction of its axis to increase the efficiency and smoothness of the cutting action.

Commonly the surfaces of the slab to be divided in an angular or sinuous line will be supported in horizontal planes, in which case the axis of the dividing spindle will be vertical.

I claim—

The improvement in the art of dividing stone, &c., consisting in giving rotation to a diamond-studded spindle and relative movement between the stone and the rotating spindle, substantially in the manner described, to form angular or sinuous surfaces, as set forth.

ALONZO S. GEAR.

Witnesses:
FRANCIS GOULD,
M. W. FROTHINGHAM.